(12) United States Patent
Moore et al.

(10) Patent No.: US 12,686,470 B2
(45) Date of Patent: Jul. 21, 2026

(54) SOCKET RETAINER ASSEMBLY

(71) Applicant: Whitecap Industries, Inc., Piscataway, NJ (US)

(72) Inventors: Todd Moore, St. Paul, MN (US); Christopher E. Tomao, Robbinsville, NJ (US)

(73) Assignee: Whitecap Industries, Inc., Piscataway, NJ (US)

( * ) Notice: Subject to any disclaimer, the term of this patent is extended or adjusted under 35 U.S.C. 154(b) by 362 days.

(21) Appl. No.: 18/509,977

(22) Filed: Nov. 15, 2023

(65) Prior Publication Data

US 2024/0158051 A1 May 16, 2024

Related U.S. Application Data

(60) Provisional application No. 63/425,671, filed on Nov. 15, 2022.

(51) Int. Cl.
B63B 17/02 (2006.01)
B63B 17/00 (2006.01)
F16C 11/10 (2006.01)

(52) U.S. Cl.
CPC .............. B63B 17/02 (2013.01); F16C 11/10 (2013.01); *B63B 2017/0054* (2013.01)

(58) Field of Classification Search
CPC ....... B63B 17/00; B63B 17/02; B63B 17/026; B63B 2017/0054; F16C 11/06; F16C 11/0619; F16C 11/0623; F16C 11/0685; F16C 11/069; E04H 15/06; E04H 15/08
See application file for complete search history.

(56) References Cited

U.S. PATENT DOCUMENTS

| | | | | |
|---|---|---|---|---|
| 4,836,794 | A | * | 6/1989 | Barr ................... H01R 13/6583 |
| | | | | 439/135 |
| 6,151,756 | A | | 11/2000 | Czipri |
| 6,656,053 | B2 | * | 12/2003 | Chang ..................... F16C 11/00 |
| | | | | 464/119 |
| 6,725,871 | B1 | * | 4/2004 | Shearer ................... E04H 15/44 |
| | | | | 135/88.13 |
| 7,334,956 | B2 | * | 2/2008 | Taylor ..................... B63B 34/60 |
| | | | | 114/361 |
| 7,461,995 | B2 | | 12/2008 | Burnley |
| 7,661,747 | B2 | * | 2/2010 | Erskine ................... B63B 17/02 |
| | | | | 296/84.1 |
| 8,602,674 | B2 | * | 12/2013 | Loewe ................ F16C 11/0623 |
| | | | | 403/135 |
| 8,616,511 | B2 | * | 12/2013 | James ................... F16C 11/045 |
| | | | | 248/500 |
| 9,027,500 | B2 | * | 5/2015 | Williams ................ B63B 17/02 |
| | | | | 114/361 |
| 9,268,303 | B2 | * | 2/2016 | Ikeda ................... G03G 15/757 |
| 10,030,368 | B2 | * | 7/2018 | Vegunta ................ E02F 9/2841 |
| 10,167,894 | B2 | | 1/2019 | James |
| 10,472,022 | B1 | * | 11/2019 | Pollen ..................... E04H 15/06 |
| 10,711,821 | B2 | * | 7/2020 | Bishop .................. F16B 21/165 |
| 11,098,751 | B2 | * | 8/2021 | Hinkle ............... F16C 11/0623 |
| 11,378,114 | B2 | * | 7/2022 | Shearer ..................... F16B 9/09 |

(Continued)

*Primary Examiner* — Jonathan P Masinick
(74) *Attorney, Agent, or Firm* — Servilla Whitney LLC

(57) ABSTRACT

A socket retainer assembly configured to retain a ball of the ball assembly is described. The socket retainer includes a slidable locking pin. The socket retainer is configured for mounting of a roof or tarp used on marine vessels, for example, a Bimini top.

17 Claims, 6 Drawing Sheets

(56)                    References Cited

U.S. PATENT DOCUMENTS

2006/0228168 A1* 10/2006 Burnley ................. B63B 17/02
                                                        403/122
2016/0084299 A1*  3/2016 Sundararajan ...... F16C 11/0647
                                                        403/135

* cited by examiner

SOCKET RETAINER ASSEMBLY

CROSS-REFERENCE TO RELATED APPLICATIONS

This application claims priority to U.S. Provisional Application No. 63/425,671, filed Nov. 15, 2022, the entire disclosure of which is hereby incorporated by reference herein

TECHNICAL FIELD

The present disclosure generally relates to socket retainer assemblies that is configured to be used to mount a folding canopy, canvas, tarp or roof with support posts/tubes on a marine vessel such as a boat. More specifically, the disclosure pertains to a socket retainer assembly that is configured to be mounted to a marine vessel surface such as a gunwale, windshield, or radar arch for supporting a Bimini top.

BACKGROUND

Folding canopies, tarps, canvases, or roofs are commonly mounted with support posts or tubes and held in place by a socket retainer assembly. A specific example of a roof or tarp used on marine vessels is a Bimini top, which is an open-front canvas top for the cockpit of a boat, usually supported by a metal frame comprising poles or tubes. Most Bimini tops can be collapsed when not in use and raised again if shade or shelter from rain is desired.

Socket retainer assemblies are usually mounted on surfaces of a boat. In existing socket retainer designs, the support post has a ball end that slides into the socket retainer. The socket retainer assembly receives the ball end of the support post of the canopy, tarp or Bimini top and locks it in place so that the ball end cannot be removed from the socket of the socket retainer assembly without unlocking it. Once locked in the socket retainer assembly, the ball is free to move and rotate in the retainer. The locking of the ball in the socket retainer assembly is accomplished by a removable pin that is inserted into the socket retainer assembly.

Socket retainer assemblies typically have a C-shaped channel that forms the ball socket and include two mounting holes for attachment to a surface, such as the gunwale, windshield, or radar arch of a boat. Socket retainer assemblies include a stainless steel portion and a plastic insert in the area that receives and retains the ball. A removable pin is inserted through the socket retainer assembly to lock the ball end in place. The removable pin may be attached to a lanyard to prevent the pin from being lost or misplaced. The pin may also include a spring-loaded ball that keeps the pin from being unintentionally removed by vibration or other non-intentional ways.

Disadvantages of existing socket retainer assemblies as described above include that the pin must be fully removed from the retainer to remove or insert the ball end of the canopy support pole. This can lead to difficulties in setting up the canopy. It also affords the possibility of pin being lost is the lanyard fails or if no lanyard is provided. If the pin is not disposed in the socket retainer assembly, the pin can cause noise and may damage the surface of the boat.

Alternative socket retainer assembly designs exist, however, in one design, the socket retainer assembly relies on rotation of a locking pin that allows for the entry and egress of the ball fitting into the socket. A disadvantage with this design is that rotation of the locking pin is not intuitive because in most common designs, pins are pulled to be released from a socket. Additionally, the locked or unlocked position of the locking pin is not visually perceptible, and a user of the socket retainer could easily leave the system unlocked, which could result in the ball socket become dislodged from the socket retainer. Furthermore, the rotating locking pin can only be seen on one side, and a separate and distinct left socket retainer and a right socket retainer are required.

Thus, existing socket retainer assemblies have one or more of several of the aforementioned disadvantages and limitations, and there remains a need for improved socket retainer assemblies. It would be desirable to provide socket retainer assemblies that address the long-standing difficulties associated with existing socket retainer assemblies. It would further be desirable to provide socket retainer assemblies that provides one or more indicators when the socket retainer assembly is in a locked and an unlocked position and moved therebetween.

SUMMARY

One or more embodiments of the disclosure are directed to a socket retainer assembly configured to retain a ball connected to a support post. In one embodiment the socket retainer assembly comprises a ball-receiving body including a channel to receive the ball of the ball assembly and configured to retain the ball in the channel; and a slidable locking pin configured to slide in the ball-receiving body and configured to lock the ball in the channel in a locked position and configured to slide to an unlocked position from which the ball can be removed from the channel.

In a second embodiment, a socket retainer assembly configured to retain a ball of the ball assembly comprises a ball-receiving body including a channel to receive the ball of the ball assembly and configured to retain the ball in the channel; a slidable locking pin configured to lock and unlock the ball in the channel; a visible indicator configured to indicate when the slidable locking pin is in a locked position and an unlocked position and an audible indicator configured to indicate when the slidable locking pin moved between locked position and a unlocked position such that the user of the socker retainer assembly is confident that the socket retainer assembly is locked and unlocked.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments. Any dimensions shown in the drawing are not limiting to the disclosure or the claims.

DETAILED DESCRIPTION

Figures 1A, 1B:
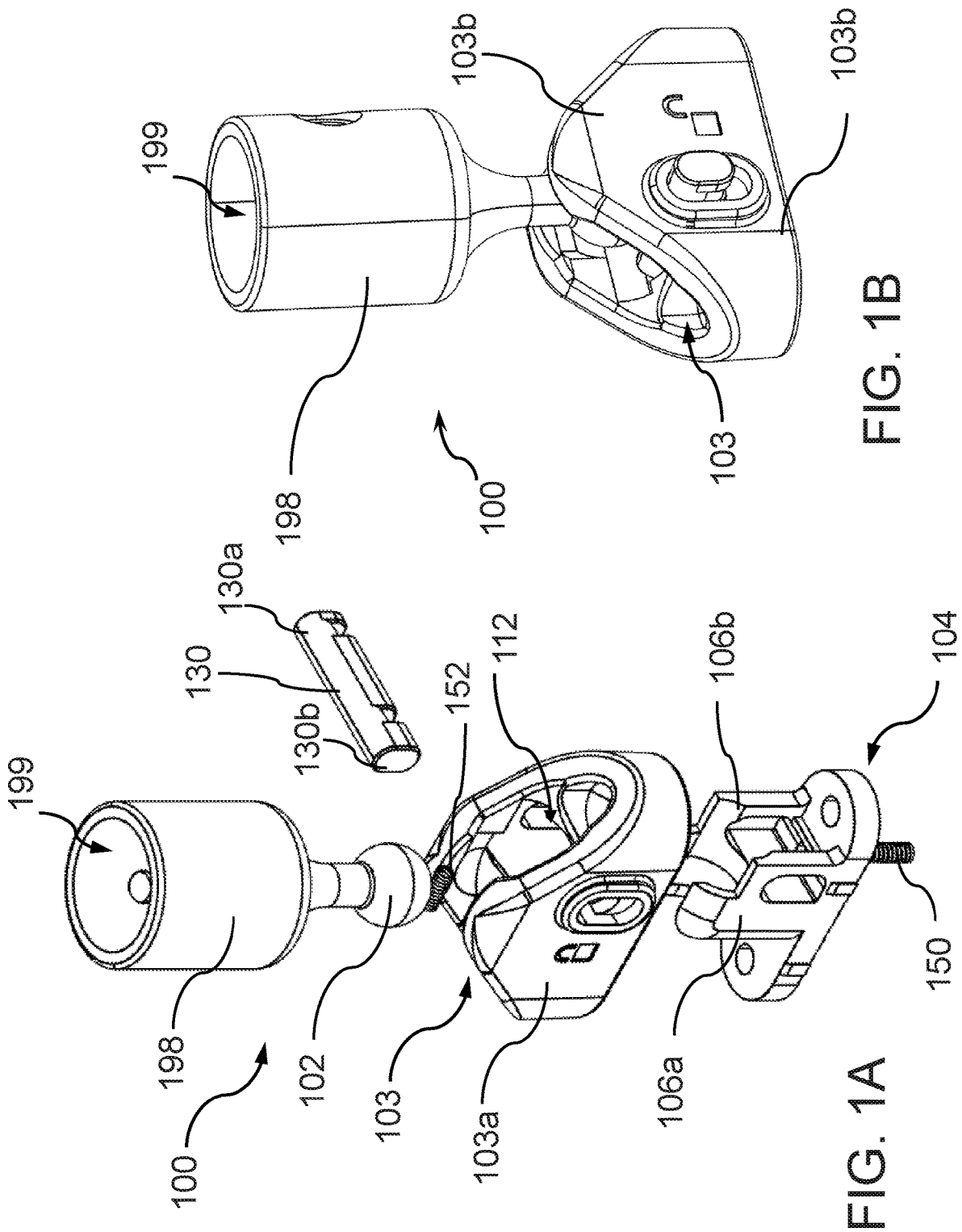
FIG. 1A is an exploded isometric view of a socket retainer assembly according to one or more embodiments.
FIG. 1B is an assembled isometric view of a socket retainer assembly according to one or more embodiments.

Before describing several exemplary embodiments of the disclosure, it is to be understood that the disclosure is not limited to the details of construction or process steps set forth in the following description. The disclosure is capable of other embodiments and of being practiced or being carried out in various ways.

The term "horizontal" as used herein is defined as a plane parallel to the plane or surface of a floor, a deck or a deck of a boat, regardless of its orientation. The term "vertical" refers to a direction perpendicular to the horizontal as just defined. The term "non-horizontal" includes planes that are at 20 degrees to 120 degrees from a horizontal plan, including, but not limited to vertical. The phrases "side mount" and "side mounted" refer to a table leg that is affixed to a non-horizontal surface of a room, a deck, a vehicle, a boat or a motorhome. For example, a side mounted or socket retainer is not affixed to the deck or gunwale of a boat, but instead is affixed to a sidewall surface of a boat such as a wall, a coaming or other non-horizontal surface. Terms, such as "above", "below", "bottom", "top", "side" (as in "sidewall"), "higher", "lower", "upper", "over", and "under", are defined with respect to the horizontal surface as shown in the figures.

The term "on" indicates that there is direct contact between elements. The term "directly on" indicates that there is direct contact between elements with no intervening elements.

In one or more embodiments, a socket retainer assembly 100 as shown in FIGS. 1 through 4A-C comprises a slidable locking pin 130 which is configured to slide back and forth to lock and unlock a ball 102 of a ball assembly 198 that is configured to be fitted on the end of a support post of a tube (not shown) to support fabric roof or tarp used on marine vessels, for example, a Bimini top. In the unlocked position, the slidable locking pin 130 is permitted to slide down and spring back up to allow the ball 102 of the ball assembly 198 to be released from a channel 112 in a ball receiving body 103. The channel 112, which is substantially C-shaped, provides a socket for insertion of the ball 102. In one or more embodiments, the channel 112 is C-shaped to receive the ball 102, which is typically substantially spherical in shape, and to hold the ball 102 in place in the channel 112 when the slidable locking pin 130 is in a locked position. A channel having such a C-shaped configuration that is configured to receive a substantially spherical ball provides the ability to mount a pole for a tarp or a Bimini top in a wide variety of positions and angles In the locked position, and the slidable locking pin 130 is configured to remain in place and be trapped to prevent downward motion. Stated another way, the slidable locking pin 130 is trapped and cannot slide within the ball-receiving body 103, thus securing the ball assembly 198 in place.

The slidable locking pin 130 is biased upwardly by a base spring 150. A detent spring 152 positioned transverse to the base spring 150 is configured to bias a ball detent 153 that contacts the slidable locking pin 130. In some embodiments, the detent spring 152 biases the ball detent 153 with a sufficient force to generate an audible sound to indicate when the slidable locking pin is moved between the locked position and unlocked position.

Thus, the socket retainer assembly 100 according to one or more embodiments provides one or both a visible indicator and an audible indicator to indicate to a user when the socket retainer assembly moved between a locked position and an unlocked position. The visible indicator can comprise a first symbol 114 showing the locked position on one side of the ball retainer assembly and a different symbol, a second symbol 115, on the other side of the ball retainer assembly 100 showing the unlocked position. For example, the second symbol 115 showing the unlocked position can comprise a letter such as "U" or an image of an unlocked padlock, and the first symbol showing the locked position can comprise a letter such as "L" or an image of locked padlock as shown in the FIGS. By simply exerting a lateral force by pushing the slidable locking pin 130 in either direction towards the desired first symbol 114 or the second symbol 115 on the socket retainer assembly 100, a user can easily determine when the socket retainer assembly 100 is in the locked position or the unlocked position.

In some embodiments, as shown in FIGS. 1A-B, FIG. 2, FIGS. 3A-C and FIGS. 4A-C, a socket retainer assembly 100 is configured to retain a ball 102 of a ball assembly 198. The ball assembly 198 comprises the ball 102 on one end and a hollow post or pole-receiving sleeve 199 on an end opposite the ball 102, which is configured to receive a pole or a post of a tarp, a canvas or a Bimini top.

The socket retainer assembly 100 comprises a ball-receiving body 103 including a first side 103a, a second side 103b opposite the first side and a lower body portion 103c. The first side 103a and the second side 103b of the ball-receiving body defines a channel 112 that is sized and configured to receive the ball 102 of the ball assembly 198 and configured to retain the ball 102 in the channel 112. The channel 112 according to one or more embodiments, is C-shaped and provides a socket to receive the ball 102 and lock the same in place when the sliding locking pin 130 is a locked position. The slidable locking pin is configured to slide in the ball-receiving body and configured to lock the ball 102 in the channel 112 in a locked position and configured to slide to an unlocked position from which the ball 102 can be removed from the channel 112.

As described above, the biasing force of the detent spring 152 biases the ball detent 153 with a sufficient force to generate an audible sound to indicate when the slidable locking pin is moved between the locked position and the unlocked position wherein the socket retainer assembly produces an audible sound to indicate when the slidable locking pin moves to and from the locked and unlocked positions.

The ball-receiving body 103 includes a visible indicator that the slidable locking pin is in a locked position and an unlocked position. In one embodiment, the visible indicator comprises a first symbol 114 indicating the locked position and a second symbol 115 indicating the unlocked position. According to one or more embodiments, the locked position, the slidable locking pin 130 is trapped and cannot slide without being pushed by a user exerting lateral force, securing the ball 102 in the channel 112. As shown, the ball-receiving body 103 comprises a hollow lower portion 103c, and the socket retainer assembly 100 further comprises a base configured 104 to mount within the hollow lower body portion 103c. In FIGS. 1A-B, 3A-C, and 4A-C the base 104 comprises a single piece including a first post 106a and a second post 106b.

Figure 2:
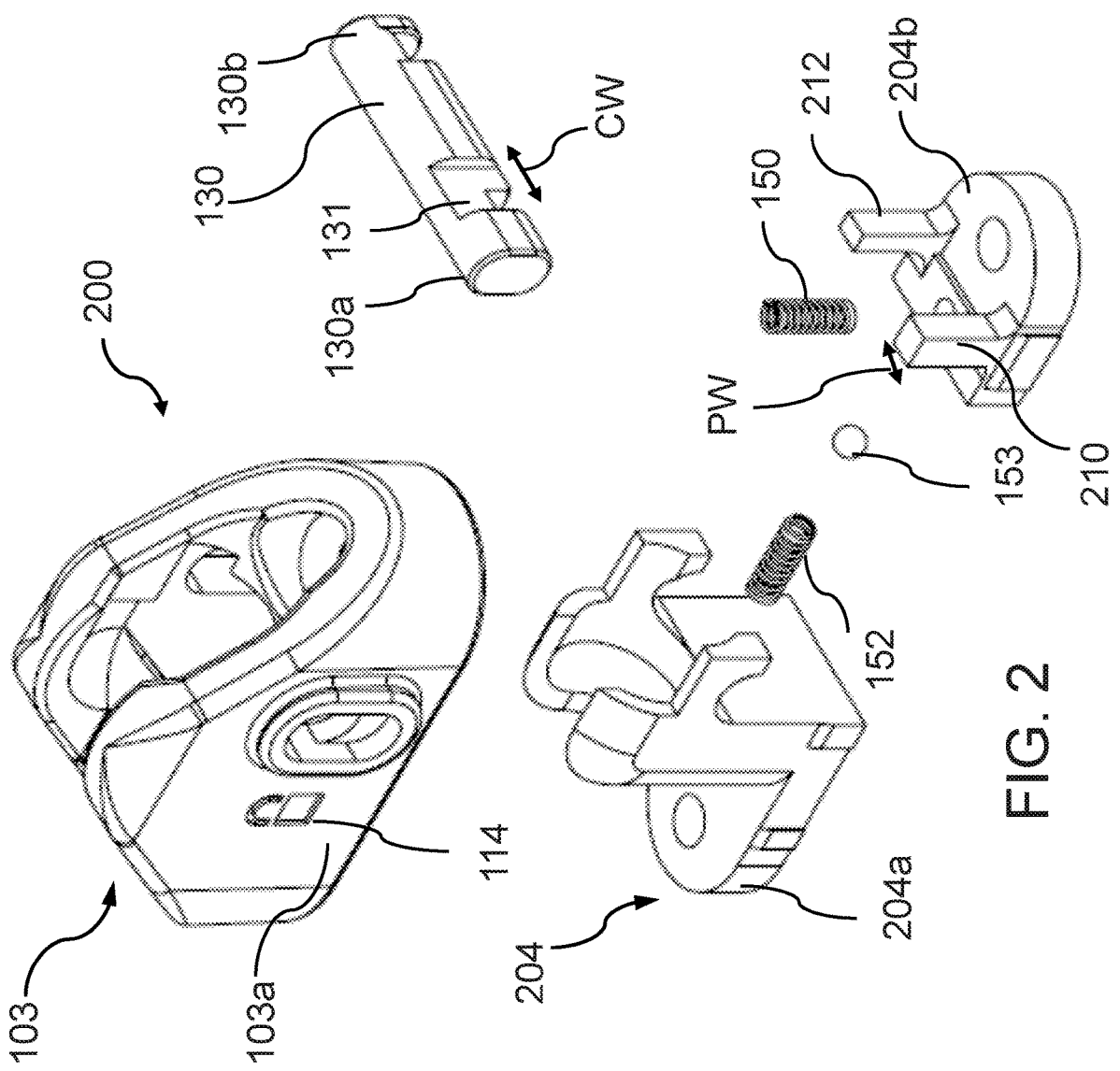
FIG. 2 show an exploded isometric view of a second embodiment of a socket retainer assembly.
Figures 3A, 3B:
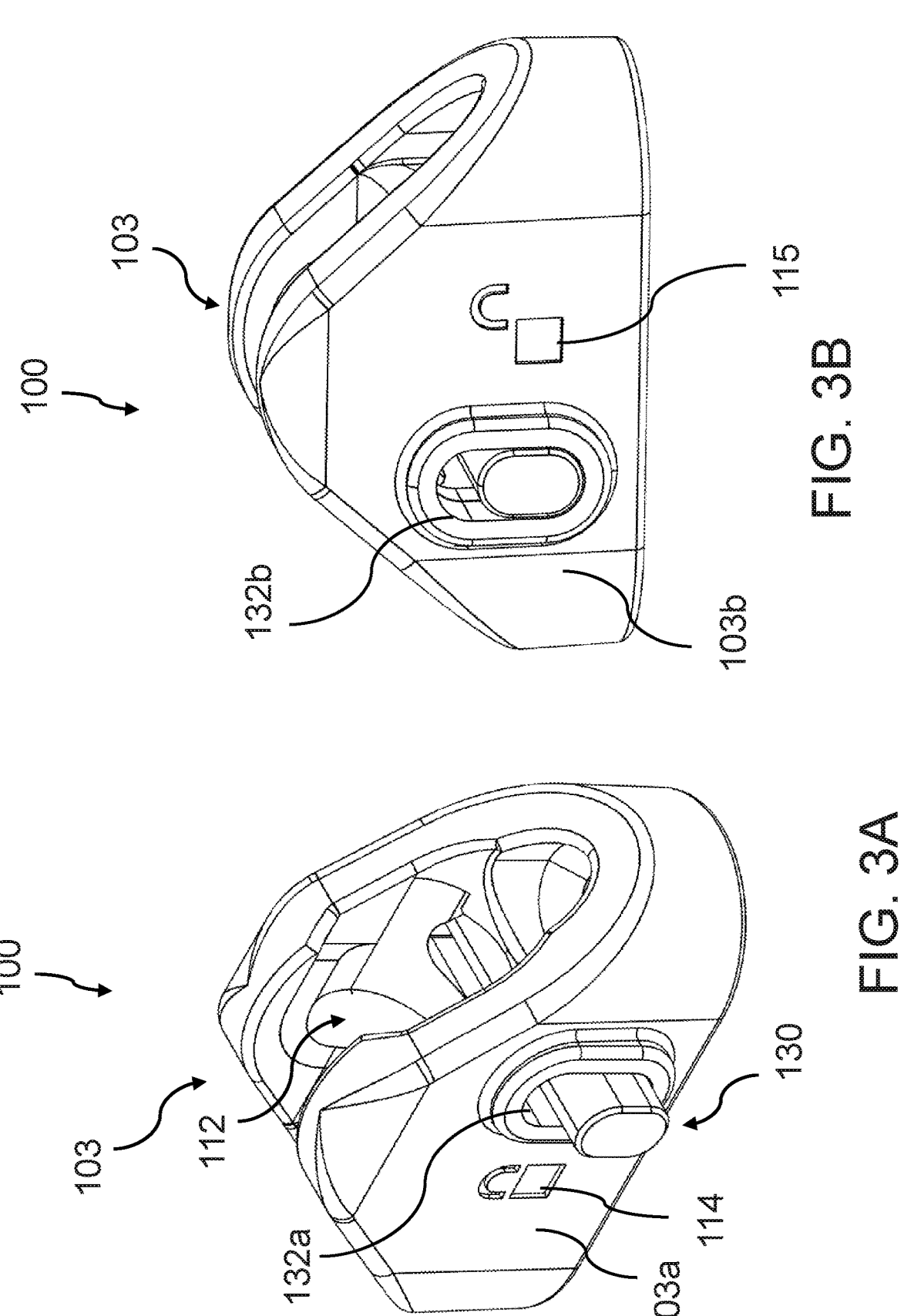
FIGS. 3A-C show in an unlocked position views of the socket retainer assembly shown in FIG. 1A.
Figure 3C:
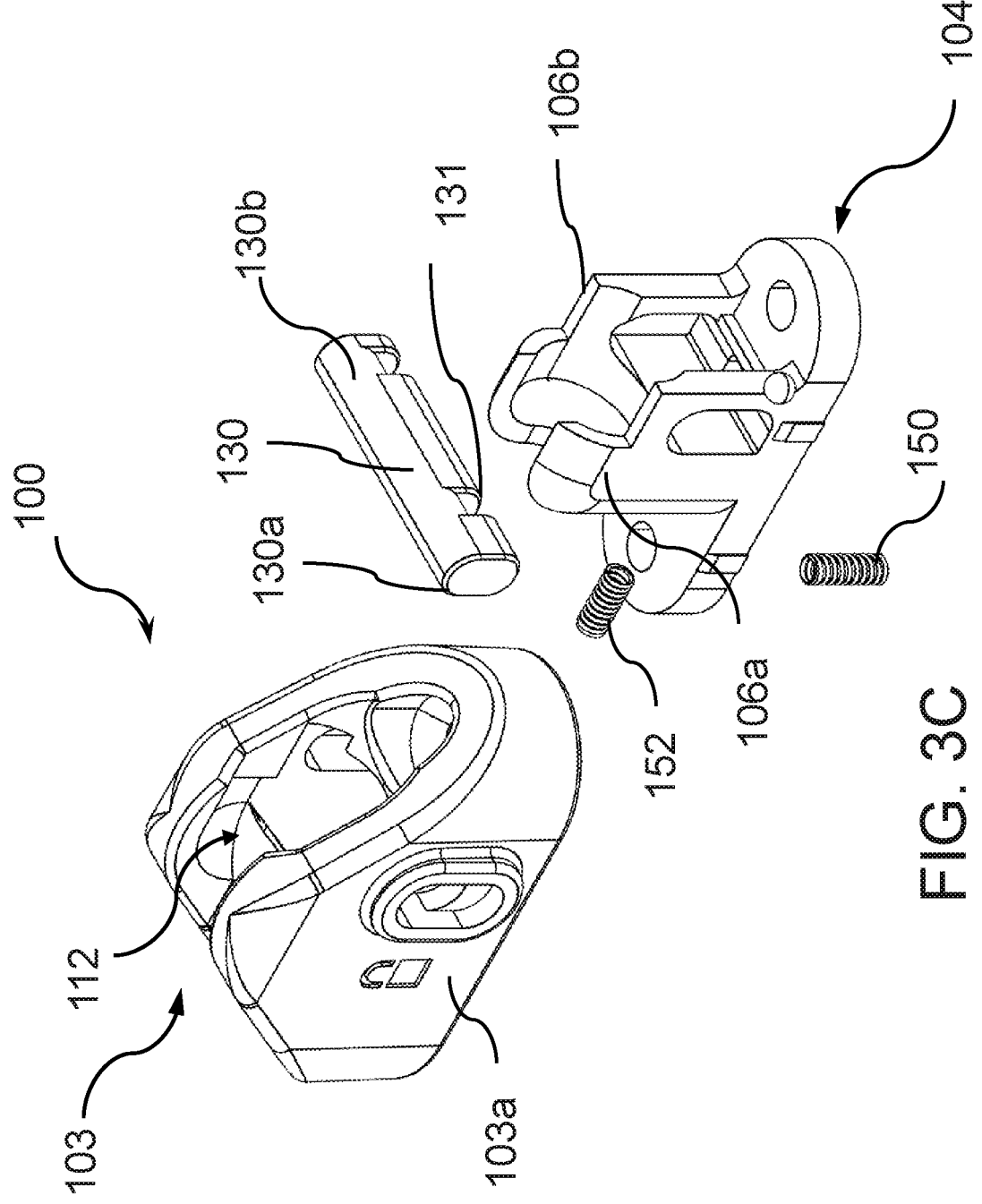
Figures 4A, 4B:
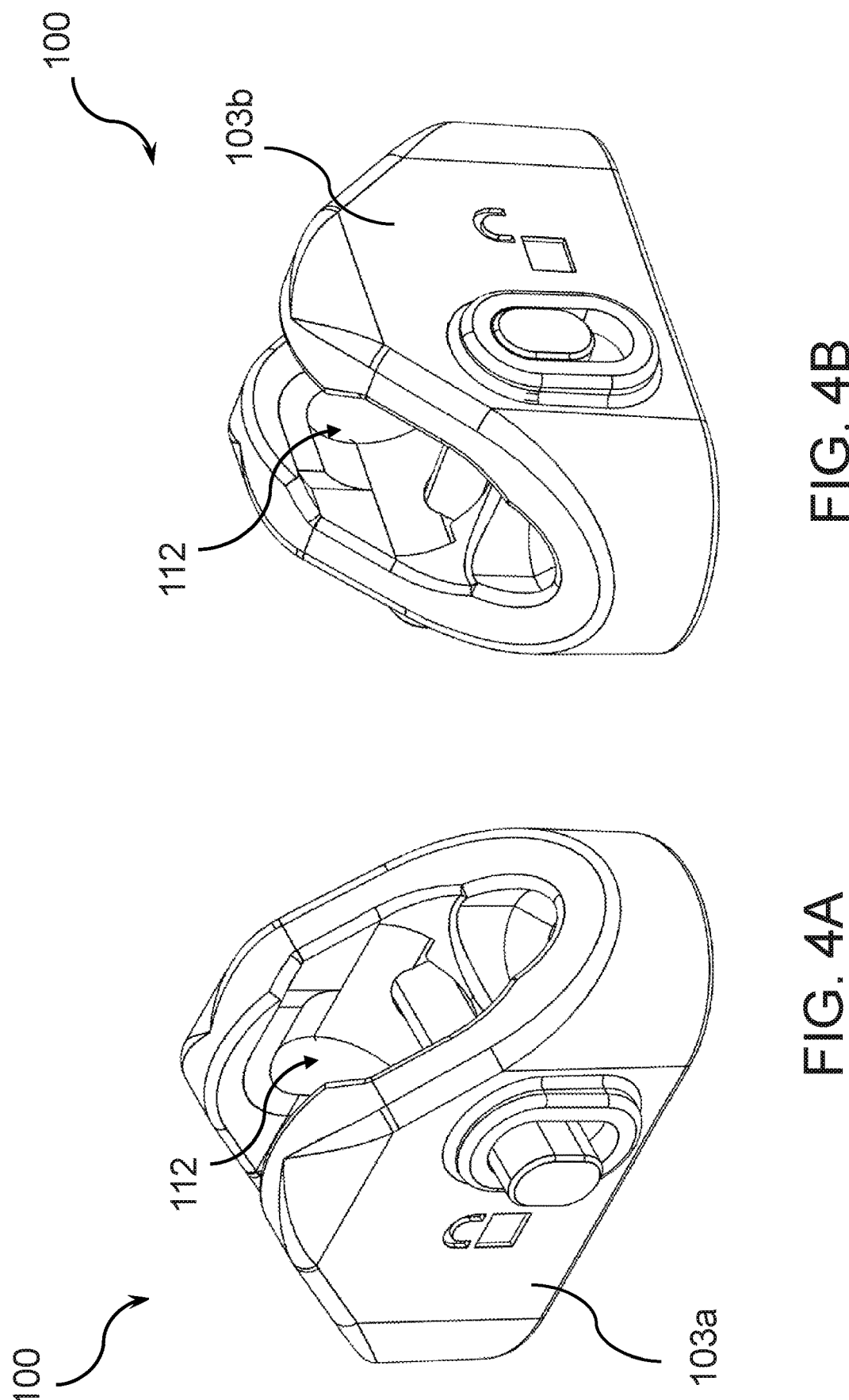
FIGS. 4A-C show locked position views of the socket retainer assembly shown in FIG. 1A.
Figure 4C:
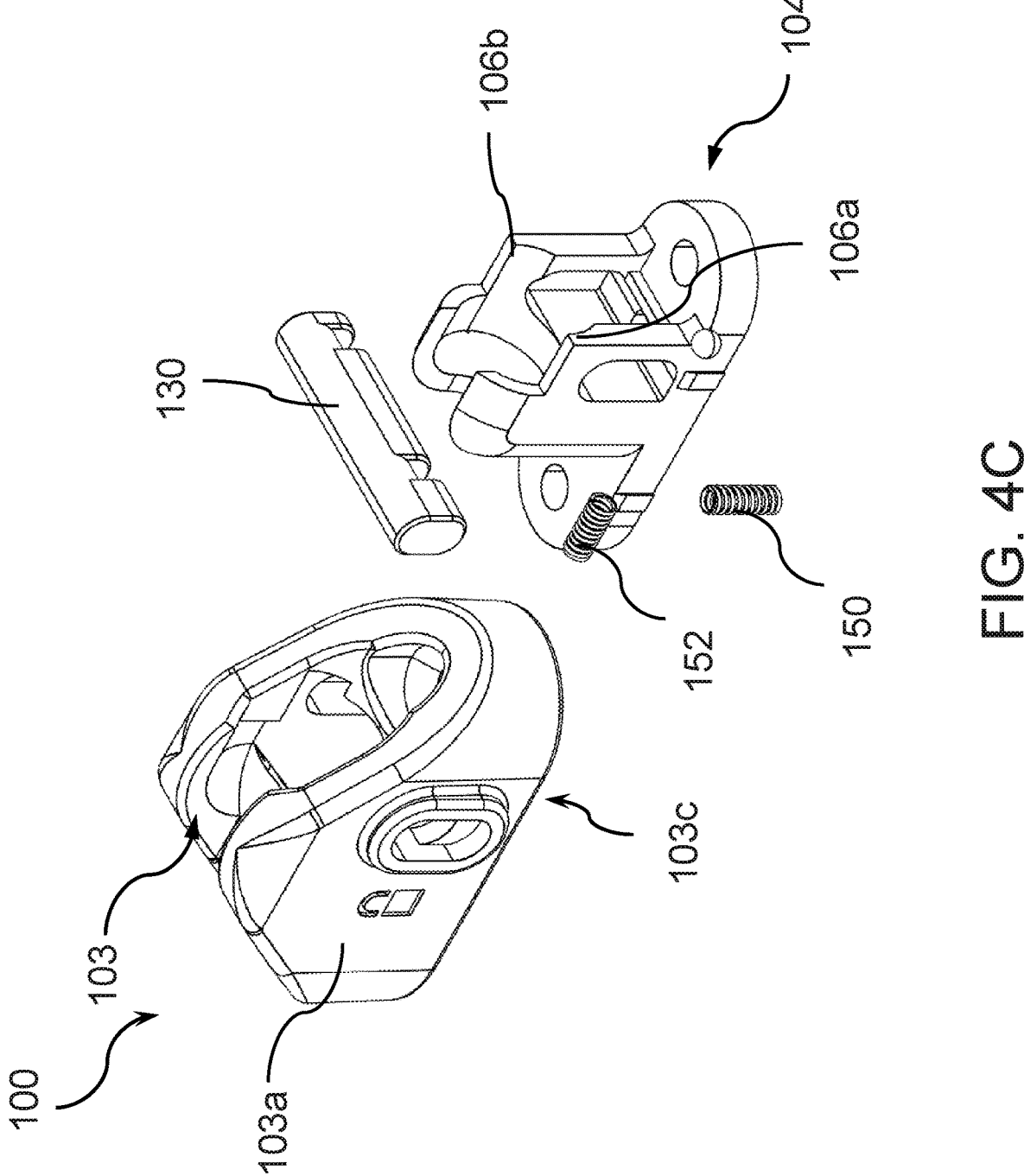

The slidable locking pin 130 comprises a first end 130a, a second end 130b and a locking channel 131 having a channel width CW (as shown in FIG. 2), and the locking channel 131 is configured to engage a first post 106a which is configured as a locking post (in FIGS. 1A-B, 3A-C and 4A-C; 210 in FIG. 2) on the base 104.

FIG. 2 shows a second embodiment of a socket retainer assembly 200 according to a second embodiment, where the components of the ball-receiving body 103 and the locking pin 130 are essentially the same as in the first embodiment shown in FIGS. 1A-B, FIG. 3A-C and FIG. 4A-C, except in FIG. 2, the base 204 comprises a first base portion 204*a* and a second base portion 204*b* separate from the first base portion 204*a*. The second base portion 204*b* comprises a first post 210 which has a post width PW, which is less than the channel width CW of the locking pin 130 and as second post 212 spaced from the first post. Thus, the post width PW, which is narrower than the channel width CW of the locking pin 130, is configured to allow the slidable locking pin 130 to slide between the locked position and the unlocked position. The first base portion 204*a* and the second base portion form receiving area for the locking pin 130.

The ball-receiving body 103 comprises a first slot 132*a* on a first side 103*a* of the ball-receiving body 103 and a second slot 132*b* on a second side 103*b* of the ball-receiving body 103, and the slidable locking pin is mounted in the first slot 132*a* and the second slot 132*b* in slidable engagement therewith. In some embodiments, the first base portion 204*a* and the separate second base portion 204*b* provide a modular assembly and is configured to enable the socket retainer assembly 100 to be assembled with the locking pin mounted in the first slot 132*a* and the second slot 132*b* and the base spring 150 and the detent spring 152 biasing the ball detent 153 that contacts the slidable locking pin 130. Thus, the base spring 150 is configured to bias the slidable locking pin 130 upwardly to ensure the slidable locking pin 130 is retained in the up position in the first slot 132*a* and the second slot 132*b* provided in the ball-receiving body 103. The detent spring 152 biases the ball detent 153 with a sufficient force to generate an audible sound to indicate when the slidable locking pin is moved between locked position and the unlocked position. The detent spring 152 and the ball detent 153 are configured to cooperate maintain the slidable locking pin 130 engaged in a position so that the slidable locking pin 130 will not vibrate free from the locked position.

In some embodiments, the base spring 150 is positioned on the base to bias the slidable locking pin 130 upwardly to ensure the slidable locking pin 130 is retained in the up position in the locking in a receiving slot 132 formed in the ball-receiving body 110. This enables the sliding locking pin 130 to travel freely in lateral direction (along an x-axis) to easily unlock and lock the socket retainer assembly 100 to free the ball 102 from the socket retainer assembly 100.

The socket retainer assemblies described herein are designed so one person can easily mount and set up a Bimini top on a boat without the aid of a second person. In addition to Bimini tops, the socket retainer assemblies described herein can be used to mount aft and fore shades, ski arch Biminis, convertible tops, dodgers, support poles and many more applications.

Thus, one or more embodiments of the disclosure provide a socket retainer assembly 100 in which a ball retainer assembly comprises a slidable locking pin which is configured to slide back and forth to lock and unlock a ball 102 on the end of a ball assembly 198 that is configured to receive a tube, post or pole for mounting a Bimini top. In the unlocked position, the biasing action of a base spring 150 biases a slidable locking pin, which is permitted to slide down and spring back up to allow the ball 102 to be released from the channel 112. In the locked position, the slidable locking pin is configured to remain in place from the biasing force of the base spring 150 and be trapped to prevent downward motion. Stated another way, the slidable locking pin 130 is trapped and cannot translate, thus securing the ball fitting in place. Thus, the slidable locking pin 130 is biased upwardly by a base spring 150. In addition, the socket retainer assembly 100 according to one or more embodiments provides one or both a visible indicator and an audible indication to indicate to a user when the socket retainer is moved between a locked position and an unlocked position. The visible indicator can be a symbol showing the locked position on one side of the ball retainer and a different symbol on the other side of the ball retainer showing the unlocked position. For example, the second symbol being an unlocked position symbol can be a letter such as "U" or an image of an unlocked padlock, and the locked position symbol can be a letter such as "L" or an image of locked padlock as shown in the drawings. By simply pushing the slidable locking pin in either direction towards the desired symbol on the socket retainer, a user can easily determine when the socket retainer is in the locked or the unlocked position.

According to one or more embodiments, the ball-receiving body 103 is made from metal such as stainless steel and the base 104 or base 204 comprises plastic. The base 204 comprising the first base portion 204*a* and the second base portion 204*b* as a separate piece facilitates ease of assembly of the slidable locking pin 130 with the base spring 150, the detent spring 152 and the ball detent 153 to form the assembly in which the slidable locking pin slides in first slot 132*a* and 132*b* from the unlocked position to the locked position and back. The extent of travel of the slidable locking pin 130 from the locked position to the unlocked position is defined by the channel width CW of the locking channel 131 in the slidable locking pin 130 and the post width PW. The channel width CW of the locking channel 131 relative to the post width PW of first post 106*a* of the first embodiment or first post 210 in the second embodiment in FIG. 2. Because the post width PW is less than the channel width CW of the locking channel, this difference in width defines a travel distance of the slidable locking pin 130 that permits the slidable locking pin to move between a locked position and an unlocked position.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A socket retainer assembly configured to retain a ball connected to a support post, the socket retainer assembly comprising:

a ball-receiving body including a channel to receive the ball and configured to retain the ball in the channel, the ball-receiving body further including a hollow lower body portion;

a slidable locking pin configured to slide in the ball-receiving body and configured to lock the ball in the channel in a locked position and configured to slide to an unlocked position from which the ball can be removed from the channel, the slidable locking pin; and a base configured to mount within the hollow lower body portion, the slidable locking pin comprising a locking channel having a channel width, and the locking channel is configured to engage a locking post on the base, the locking post having a post width that is less than the channel width to allow the slidable locking pin to slide between the locked position and the unlocked position.

2. The socket retainer assembly of claim 1, wherein the socket retainer assembly produces an audible sound to indicate when the slidable locking pin moves between the locked position and the unlocked position.

3. The socket retainer assembly of claim 1, wherein the ball-receiving body includes a visible indicator that the slidable locking pin is in the locked position and the unlocked position.

4. The socket retainer assembly of claim 3, wherein the visible indicator comprises a first symbol indicating the locked position and a second symbol indicating the unlocked position.

5. The socket retainer assembly of claim 1, wherein in the locked position, the slidable locking pin is trapped and cannot slide without being pushed by a user, securing the ball in the channel.

6. The socket retainer assembly of claim 1, wherein the ball-receiving body comprises a first slot on a first side of the ball-receiving body and a second slot on a second side of the ball-receiving body, and the slidable locking pin is mounted in slidable engagement with the first slot and the second slot.

7. The socket retainer assembly of claim 6, wherein the base comprises a first base portion and a separate second base portion, configured to enable the socket retainer assembly to be assembled.

8. A socket retainer assembly configured to retain a ball connected to a support post, the socket retainer assembly comprising:

a ball-receiving body including a channel to receive the ball and configured to retain the ball in the channel;

a slidable locking pin configured to slide in the ball-receiving body and configured to lock the ball in the channel in a locked position and configured to slide to an unlocked position from which the ball can be removed from the channel; and a base spring configured to bias the slidable locking pin upwardly to ensure the slidable locking pin is retained in the up position in a receiving slot formed in the ball-receiving body.

9. The socket retainer assembly of claim 8, further comprising a detent spring configured to bias a ball detent that contacts the slidable locking pin.

10. The socket retainer assembly of claim 9, wherein the detent spring biases the ball detent with a sufficient force to generate an audible sound to indicate when the slidable locking pin is moved between the locked position and the unlocked position.

11. The socket retainer assembly of claim 9, wherein the detent spring and the ball detent are configured to cooperate and maintain the slidable locking pin engaged in a position so that the slidable locking pin will not vibrate free from the locked position.

12. The socket retainer assembly of claim 11, wherein the ball-receiving body comprises a hollow lower body portion and a base configured to mount within the hollow lower body portion.

13. The socket retainer assembly of claim 12, wherein the slidable locking pin comprises a locking channel having a channel width that engages a locking post on the base, the locking post having a post width that is less than the channel width to allow the slidable locking pin to slide between the locked position and the unlocked position.

14. The socket retainer assembly of claim 13, wherein the ball-receiving body comprises a first slot on a first side of the ball-receiving body and a second slot on a second side of the ball-receiving body, and the slidable locking pin is mounted slidable engagement with the first slot and the second slot.

15. The socket retainer assembly of claim 14, wherein the base comprises a first base portion and a separate second base portion, configured to enable the socket retainer assembly to be assembled.

16. A socket retainer assembly configured to retain a ball of a ball assembly, the socket retainer assembly comprising:

a ball-receiving body including a channel to receive the ball of the ball assembly and configured to retain the ball in the channel, the ball-receiving body comprising a hollow lower body portion and the socket retainer assembly further comprises a base configured to mount within the hollow lower body portion, the base including a locking post; and a slidable locking pin configured to lock and unlock the ball in the channel, the slidable locking pin comprising a locking channel having a channel width that engages a locking post, the locking post having a post width that is less than the channel width to allow the slidable locking pin to slide between a locked position and an unlocked position, and the ball-receiving body comprises a first slot on a first side of the ball-receiving body and a second slot on a second side of the ball-receiving body, and the slidable locking pin is mounted in sliding engagement with the first slot and the second slot; and a visible indicator configured to indicate when the slidable locking pin is in a locked and an unlocked position and an audible indicator configured to indicate when the slidable locking pin moved between a locked position and an unlocked position.

17. The socket retainer assembly of claim 16, further comprising a base including a first base portion and a separate second base portion, configured to enable the socket retainer assembly to be assembled.

* * * * *